US009766709B2

(12) United States Patent
Holz

(10) Patent No.: US 9,766,709 B2
(45) Date of Patent: Sep. 19, 2017

(54) DYNAMIC USER INTERACTIONS FOR DISPLAY CONTROL

(71) Applicant: Leap Motion, Inc., San Francisco, CA (US)

(72) Inventor: David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 400 days.

(21) Appl. No.: 14/214,336

(22) Filed: Mar. 14, 2014

(65) Prior Publication Data

US 2014/0282282 A1    Sep. 18, 2014

Related U.S. Application Data

(60) Provisional application No. 61/792,087, filed on Mar. 15, 2013.

(51) Int. Cl.
G06F 3/01    (2006.01)
G06F 3/03    (2006.01)

(52) U.S. Cl.
CPC ............ G06F 3/017 (2013.01); G06F 3/0304 (2013.01)

(58) Field of Classification Search
CPC .............................. G06F 3/017; G06F 3/0304
See application file for complete search history.

(56) References Cited

U.S. PATENT DOCUMENTS

| 8,638,989 | B2 | 1/2014 | Holz | |
|---|---|---|---|---|
| 2005/0026689 | A1* | 2/2005 | Marks | G06F 3/0304 463/36 |
| 2006/0033713 | A1* | 2/2006 | Pryor | G06F 3/042 345/158 |
| 2007/0061495 | A1* | 3/2007 | Cummins | G06F 9/445 710/62 |
| 2010/0027845 | A1 | 2/2010 | Kim et al. | |
| 2011/0083112 | A1* | 4/2011 | Matsubara | G06F 3/011 715/863 |
| 2011/0085705 | A1* | 4/2011 | Izadi | G06K 9/00369 382/103 |
| 2011/0109554 | A1* | 5/2011 | Boissier | G06F 3/03545 345/166 |
| 2011/0173204 | A1* | 7/2011 | Murillo | A63F 13/06 707/741 |

(Continued)

*Primary Examiner* — Ajay Bhatia
*Assistant Examiner* — Justin R Blaufeld
(74) *Attorney, Agent, or Firm* — Haynes Beffel & Wolfeld LLP; Ernest J. Beffel, Jr.; Andrew L. Dunlap

(57) ABSTRACT

The technology disclosed relates to using gestures to supplant or augment use of a standard input device coupled to a system. It also relates to controlling a display using gestures. It further relates to controlling a system using more than one input device. In particular, it relates to detecting a standard input device that causes on-screen actions on a display in response to control manipulations performed using the standard input device. Further, a library of analogous gestures is identified, which includes gestures that are analogous to the control manipulations and also cause the on-screen actions responsive to the control manipulations. Thus, when a gesture from the library of analogous gestures is detected, a signal is generated that mimics a standard signal from the standard input device and causes at least one on-screen action.

18 Claims, 9 Drawing Sheets

(56) References Cited

U.S. PATENT DOCUMENTS

| | | | |
|---|---|---|---|
| 2013/0290911 A1* | 10/2013 | Praphul | G06F 3/017 |
| | | | 715/863 |
| 2014/0132498 A1* | 5/2014 | Miller | G08C 23/04 |
| | | | 345/156 |
| 2014/0258943 A1* | 9/2014 | Gossweiler, III | G06F 9/4443 |
| | | | 715/863 |

* cited by examiner

DYNAMIC USER INTERACTIONS FOR DISPLAY CONTROL

RELATED APPLICATION

This application claims the benefit of U.S. provisional Patent Application No. 61/792,087, entitled, "DYNAMIC USER INTERACTIONS FOR DISPLAY CONTROL," filed 15 Mar. 2013. The provisional application is hereby incorporated by reference for all purposes.

FIELD OF THE TECHNOLOGY DISCLOSED

The technology disclosed relates, in general, to display control, and in particular to display control based on dynamic user interactions.

BACKGROUND

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. While suitable for small display devices such as tablets and wireless phones, touch screens are impractical for large entertainment devices that the user views from a distance. Particularly for games implemented on such devices, electronics manufacturers have developed systems that detect a user's movements or gestures and cause the display to respond in a contextually relevant manner. The user's gestures can be detected using an optical imaging system, and are characterized and interpreted by suitable computational resources. For example, a user near a TV can perform a sliding hand gesture, which is detected by the gesture-recognition system; in response to the detected gesture, the TV can activate and display a control panel on the screen, allowing the user to make selections thereon using subsequent gestures; for example, the user can move her hand in an "up" or "down" direction, which, again, is detected and interpreted to facilitate channel selection.

While these gesture-recognition systems have generated substantial consumer excitement, the user accustomed to traditional input devices must forgo familiar patterns of interactivity in favor of a new mode with its own "vocabulary" of command and response. Indeed, gesture vocabularies can vary from system to system. Particularly for traditional applications—such as web browsers and word processors, whose operation depends heavily on familiar controllers—consumer resistance to adopting gesture-based control can be substantial.

Consequently, there is a need for a gesture-recognition system that responds in ways similar to the behavior of conventional control devices, and ideally which is responsive to user perceptions of what constitutes similarity.

SUMMARY

The technology disclosed relates to using gestures to supplant or augment use of a standard input device coupled to a system. It also relates to controlling a display using gestures. It further relates to controlling a system using more than one input device. In particular, it relates to detecting a standard input device that causes on-screen actions on a display in response to control manipulations performed using the standard input device. Further, a library of analogous gestures is identified, which includes gestures that are analogous to the control manipulations and also cause the on-screen actions responsive to the control manipulations. Thus, when a gesture from the library of analogous gestures is detected, a signal is generated that mimics a standard signal from the standard input device and causes at least one on-screen action.

Implementations of the technology disclosed also relate to methods and systems that recognize gestures and cause on-screen behaviors that mimic, at an intuitive level, the behavior of a traditional input device. Recognizing that different individuals can equate different gestures to traditional input-device manipulations, implementations of the technology disclosed ideally (although not necessarily) permit the user to define these gestures and the associated actions taken. Implementations in accordance herewith can detect the presence of a conventional input device either visually, through object recognition, or by querying the operating system to determine what devices are connected. This determination drives the gestural control paradigm—i.e., the actions taken or rule(s) responsively followed based on observed motion within a monitored space, and which generally relates gestures to manipulation of displayed screen contents. The gestural control paradigm can also be based on the currently active application. For example, if the user is playing a game developed specifically for gestural interactivity, the presence of a mouse will be ignored; but if the user is browsing the web, a mouse-like control paradigm can be followed.

Thus, implementations of the technology disclosed can, in effect, "get between" a device driver and the display. A user working with a word-processing program, for example, would expect to see a cursor and a control arrow on the screen. Implementations of the technology disclosed, sensing the presence of a mouse and use of the word processor, can load a gesture control paradigm that retains the on-screen presence of the cursor and the control arrow and relates user gestures to mouse operations. In some implementations, the user can define the gesture vocabulary—selecting, for example, the gesture that will correspond to a mouse left-click, right-click, etc. The system can also permit the user to turn off gesture recognition and release control back to the mouse driver. Similarly, the system can respond to an intentional gesture to override an input-device driver with gesture recognition.

In some implementations, a replica or other representation of (or based on) the user's hand can be inserted into the display, either as a substitute for conventional control graphics or to augment them. For example, a replica of the user's hand can substitute for the traditional hand icon used in ADOBE and other applications, and behave (in terms of on-screen actions caused by grabbing, moving, etc.) in a similar way. Alternatively, the hand replica can "stick" to a traditional icon, such as an arrow or cursor, which is moved on the screen to follow the user's hand movements in space—in effect, the user's spatial hand movements replace corresponding movements of a conventional mouse.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, steps, or characteristics can be combined in any suitable manner in one or more examples of the technology. The headings provided herein are for convenience only and are not intended to limit or interpret the scope or meaning of the claimed technology.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

As used herein, a given signal, event or value is "responsive to" a predecessor signal, event or value of the predecessor signal, event or value influenced by the given signal, event or value. If there is an intervening processing element, action or time period, the given signal, event or value can still be "responsive to" the predecessor signal, event or value. If the intervening processing element or action combines more than one signal, event or value, the signal output of the processing element or action is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Figure 1A:
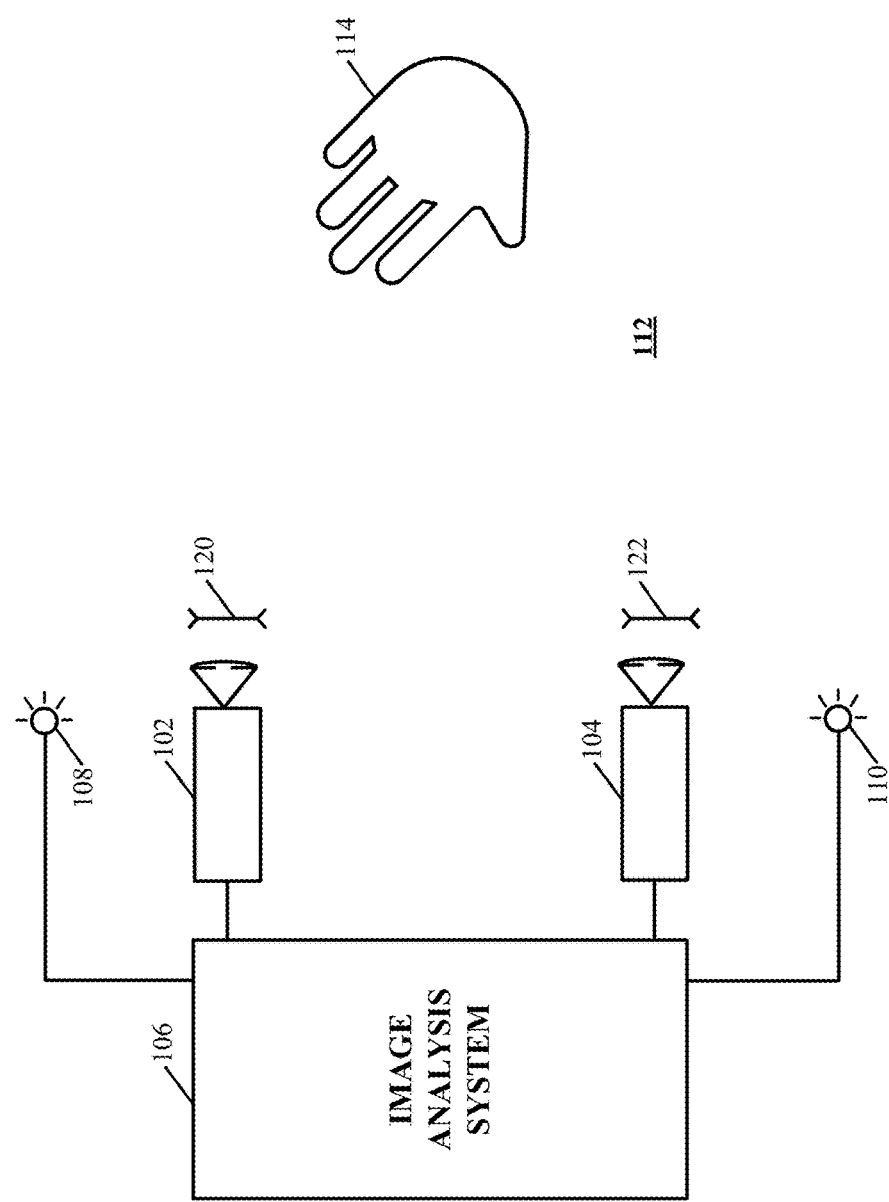
FIG. 1A illustrates a system for capturing image data according to an implementation of the technology disclosed.

Refer first to FIG. 1A, which illustrates an exemplary gesture-recognition system 100 including any number of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which can or may not be within the visible spectrum, and can be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

In some implementations, the illustrated system 100 includes one or more sources 108, 110, which can be disposed to either side of cameras 102, 104 and are controlled by image-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100 to operate under a broad range of lighting conditions and can avoid various inconveniences or distractions that can be associated with directing visible light into the region where gestures take place. However, a particular wavelength or region of the electromagnetic spectrum is required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures. In some implementations, the sound waves are, for example, ultrasound, that is not audible to humans (e.g., ultrasound).

It should be stressed that the arrangement shown in FIG. 1A is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 in which an object 114 can be present; cameras 102, 104 are oriented toward the region 112 to capture video images of the object 114. In some implementations, the operation of light sources 108, 110 and cameras 102, 104 is controlled by the image-analysis system 106, which can be, e.g., a computer system. Based on the captured images, image-analysis system 106 determines the position and/or motion of object 114, alone or in conjunction with position and/or motion of other objects (e.g., hand holding the gun), not shown in FIG. 1A for clarity sake, from which control (e.g., gestures indicating commands) or other information can be developed.

Figure 1B:
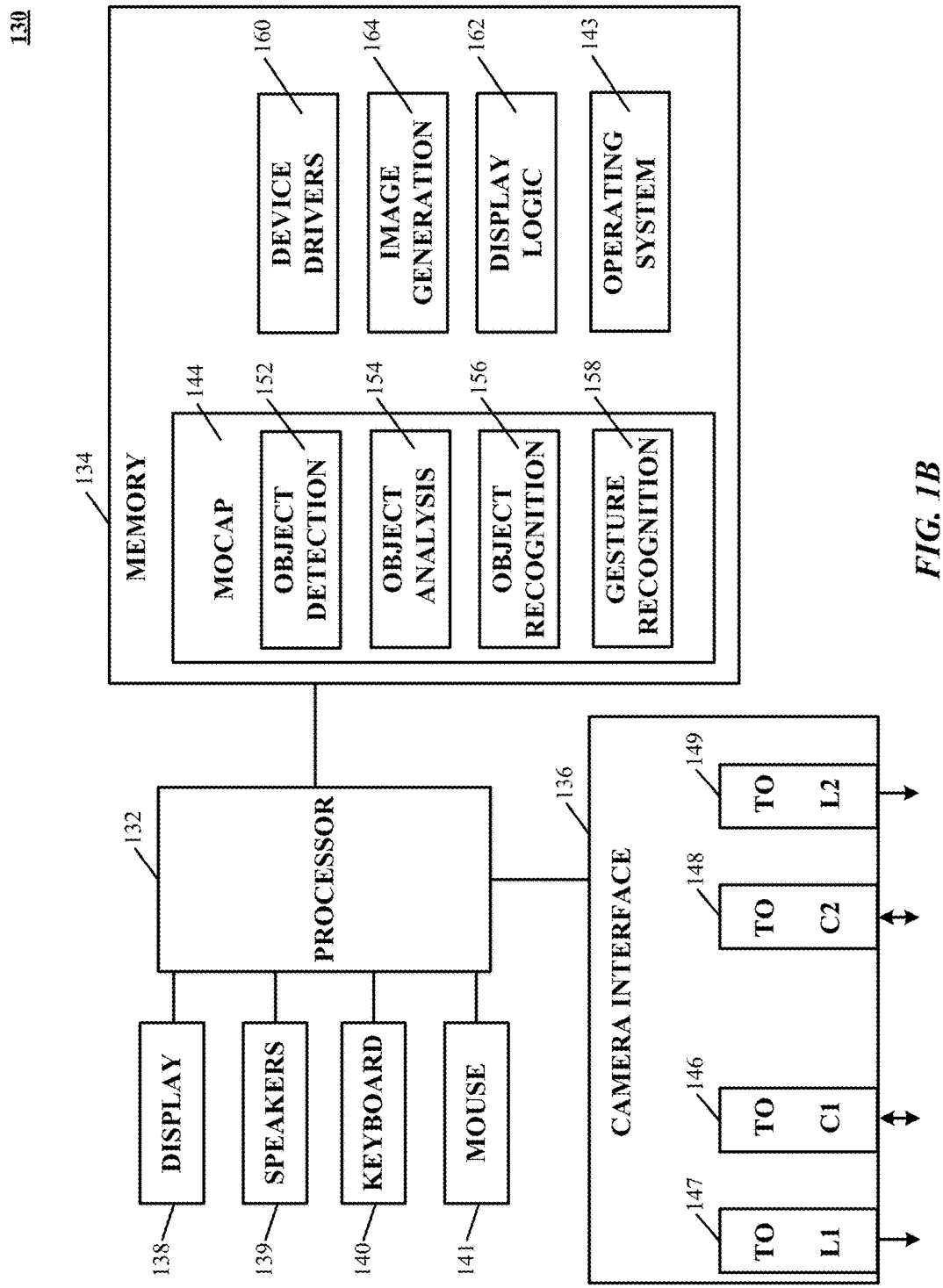
FIG. 1B is a simplified block diagram of a gesture-recognition system implementing an image analysis apparatus according to an implementation of the technology disclosed.

FIG. 1B is a simplified block diagram of a computer system 130, which implements image-analysis system 106 (also referred to as an image analysis engine or image analyzer) according to an implementation of the technology disclosed. Image-analysis system 106 can include or consist of any device or device component that is capable of capturing and processing image data. In some implementations, computer system 130 includes a processor 132, a memory 134, a camera interface 136, a display 138 (including a suitable driver), speakers 139, a keyboard 140, and a mouse 141. Memory 134 can be used to store instructions to be executed by processor 132 as well as input and/or output data associated with execution of the instructions. In particular, memory 134 contains instructions, conceptually illustrated in FIG. 2 as a group of modules described in greater detail below, that control the operation of processor 132 and its interaction with the other hardware components. More generally, an operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION or OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or writes to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera interface 136 can include hardware and/or software that enables communication between computer system 130 and cameras such as cameras 102, 104 shown in FIG. 1A, as well as associated light sources such as light sources 108, 110 of FIG. 1A. Thus, for example, camera interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 (see 200A) executing on processor 132. In some implementations, camera interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Camera interface 136 can also include controllers 147, 149 to which light sources (e.g., light sources 108, 110) can be connected. In some implementations, controllers 147,

149 supply operating current to the light sources, e.g., in response to instructions from processor 132 executing a mocap program (as described below). In other implementations, the light sources can draw operating current from an external power supply (not shown), and controllers 147, 149 can generate control signals for the light sources, e.g., instructing the light sources to be turned on or off or changing the brightness. In some implementations, a single controller can be used to control multiple light sources.

Display 138, speakers 139, keyboard 140, and mouse 141 can be used to facilitate user interaction with computer system 130. These components can be modified as desired to provide any type of user interaction. It will be appreciated that computer system 130 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 130 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Instructions defining mocap program 144 are stored in memory 134, and these instructions, when executed, perform motion-capture analysis on images supplied from cameras connected to camera interface 136. In one implementation, mocap program 144 includes various modules, such as an object detection module 152, an object analysis module 154, an object-recognition module 156, and a gesture-recognition module 158; again, these modules can be conventional and well-characterized in the art. Memory 134 can also include conventional device drivers 160 for keyboard 140, mouse 141 and any other input devices, as well as other information and/or code modules used by mocap program 144. In addition, memory 134 includes a display logic block 162, which determines the control icons or images that will be displayed, and an image-generation module 164, which can generate images for rendering on display 138 depending on the output of display logic 162. As explained below, the images can be scaled-down replicas of the detected object or can instead be animated representations graphically based on the detected object.

Figure 2A:
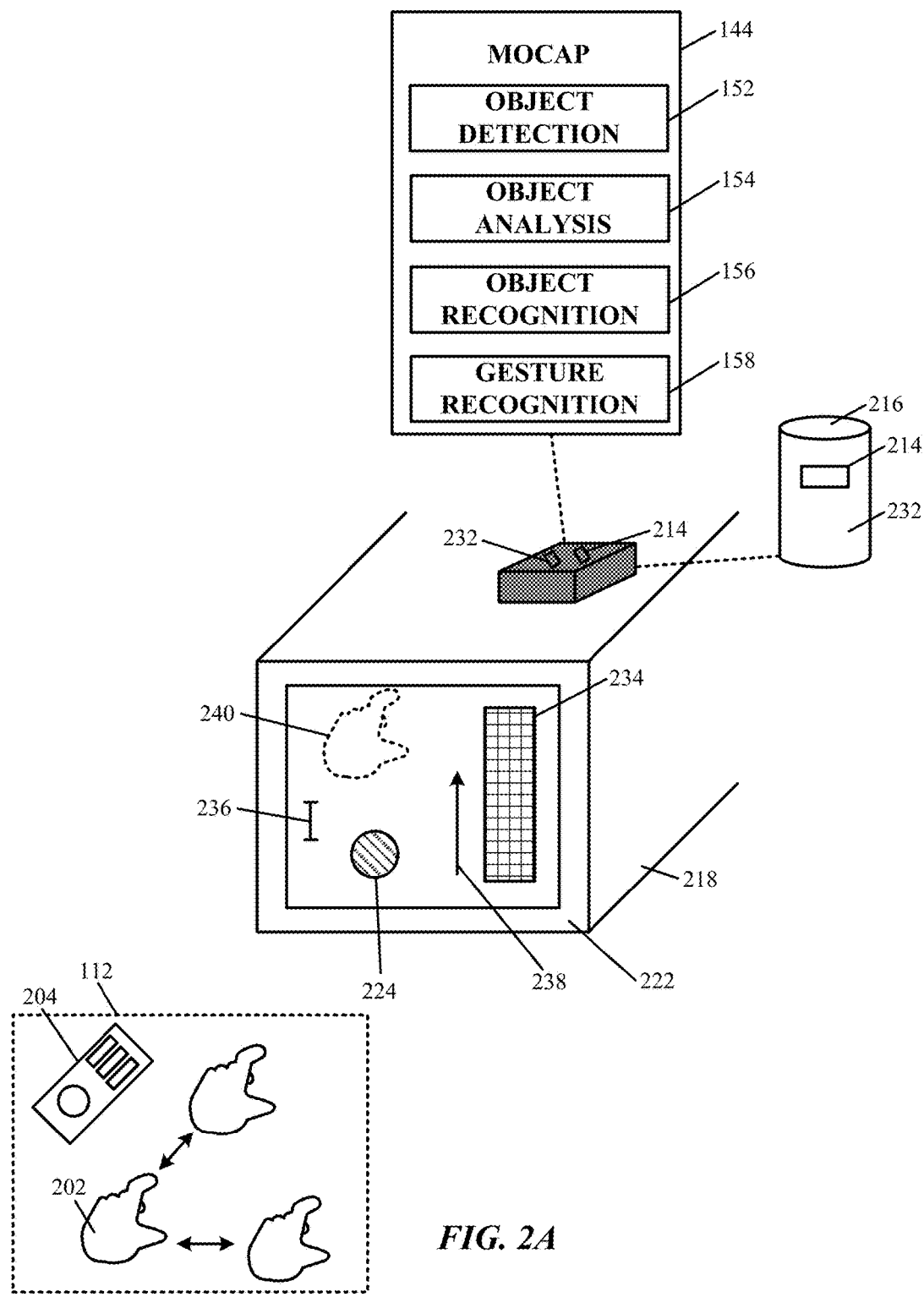
FIG. 2A depicts an electronic device controlled by a user's gestures and/or an input device in accordance with an implementation of the technology disclosed.

Referring to FIGS. 1A, 1B, and 2A, in operation, the image analysis system 106 operates cameras 102, 104 to capture at least one image in the field of view 112. The image can contain the object 114, which can be a user's body part 202 and/or an input device 204 (such as a remote controller, a keyboard, or a PC mouse). In some implementations, the object detection module 152 analyzes the captured image to detect edges of an object therein and/or other information about the object's location; subsequently, the object analysis module 154 analyzes the object information provided by the object detection module 152 to determine the 3D shape, size and/or position of the object. The object-recognition module 156 can compare the detected object 114 to reference images or object templates electronically stored in an object database 214 using conventional comparison algorithms (such as database lookup). (As used herein, the term "electronically stored" includes storage in volatile or non-volatile storage, the latter including disks, Flash memory, etc., and extends to any computationally addressable storage media (including, for example, optical storage).) The object database 214 can be implemented, for example, in the memory 134, a mass-storage device of the system 130 or on an external storage system 216.

In one implementation, upon matching the detected object 114 to an object template in the database 214, the object-recognition module 156 reports the match to display logic 162. An initial task performed by display logic 162 is obtaining an inventory of input devices associated with the system to be controlled—either system 130 or, if system 130 is itself used to provide input to a separate device 218, such as a game console, a "smart" television or a computer, then to that device; hereafter the device that will respond to user gestures is generically referred to as the "controlled device." Display logic 162 obtains this inventory this by querying operating system 143 to determine what input devices are currently connected to the controlled system; by determining whether any of the objects identified and reported by object-recognition module 156 is an input device; or both. For example, if an input device connected to the controlled system is outside the field of view 112, display logic 162 can ignore it.

Gesture-recognition module 158 can be responsive to object-detection module 156 and evaluate movements only of objects whose movements are likely to be intended as gestures—e.g., the dominant object within the field of view 112, the first detected object to move, an object recognized as a user's hand 202, finger, etc. Once a gesture-producing object is identified, it can be followed by gesture-recognition module 158 through a series of temporally sequential images captured by the cameras 102, 104 in order to recognize gestures. As discussed in greater detail below, detected gestures are used to control an application running on the controlled system. The gesture-recognition module 158 can be utilized in conjunction with algorithms based on 3D models (i.e., volumetric or skeletal models), simplified skeletal models that use a simplified representation of the human body or gesture-relevant body parts, or image-based models based on, for example, deformable templates of gesture-relevant body parts. For additional background information regarding visual hand gesture recognition, reference can be made to, e.g., Wu et al., "Vision-Based Gesture Recognition: A Review," in Gesture-Based Communication in Human-Computer Interaction (Springer 1999); Pavlovic et al., "Visual Interpretation of Hand Gestures for Human-Computer Interaction: A Review," IEEE Trans. Pattern Analysis and Machine Intelligence (19(7):677-695, July 1997). Image analysis, including object detection, object analysis, and object recognition in 3D space and in real time can be performed using a conventional approach or an approach specialized to the application (see, e.g., U.S. Ser. No. 13/742,953, filed on Jan. 16, 2013, the entire disclosure of which is hereby incorporated by reference).

Thus, gesture-recognition module 158 identifies the user's gesture by comparing the detected gesture to a library of gestures in database 232, which, again, can be implemented in the image analysis system 106, the electronic device 218, or on an external storage system 216. For example, gestures can be stored as vectors, i.e., mathematically specified spatial trajectories, and the gesture record can have a field specifying the relevant part of the user's body making the gesture; thus, similar trajectories executed by a user's hand and head can be stored in the database 232 as different gestures, so that an application can interpret them differently. Typically, the trajectory of a sensed gesture is mathematically compared against the stored trajectories to find a best match, and the gesture is recognized as corresponding to the located database entry only if the degree of match exceeds a threshold. The vector can be scaled so that, for example, large and small arcs traced by a user's hand will be recognized as the same gesture (i.e., corresponding to the same database record) but the gesture recognition module will return both the identity and a value, reflecting the scaling, for the gesture. The scale can correspond to an actual gesture distance traversed in performance of the gesture, or can be normalized to some canonical distance.

Although gestures can be used for many control and rendering purposes, the present discussion is concerned primarily with their use in controlling actions taken on the screen 222 of, e.g., a controlled device 218. In particular, gesture recognition module 158 contains records relating template gestures to actions performed by all active input devices identified by display logic 162 (or at least the display devices within the field of view 112). For example, suppose that an identified object 204 is a conventional PC mouse connected to the controlled system 218. The driver associated with the mouse 204 supports right-click, right-double-click, and left-click commands, among others. Accordingly, gesture recognition module 158 ensures that database 232 contains stored records corresponding to these commands—i.e., for each command, a record containing (i) a gesture template corresponding to the command and (ii) bits encoding an output signal (e.g., a pulse sequence) duplicating the command signal that the mouse 204 would produce. If such records are found, display logic 162 can determine whether these gestures will override the mouse driver, as discussed below. If no corresponding records are found, then the user will be prompted to perform gestures and relate them to mouse functions. In particular, gesture recognition module 158 can cause a control panel 234 to be rendered on the screen 222. The control panel 234 shows a table listing the commands associated with the mouse driver. The user sequentially selects one of the entries and assigns a gesture to it. In one implementation, the user makes the selection by gesture—e.g., moving her hand vertically in the monitored space 112 until the desired entry in the (vertical) list is highlighted, and then gesturing as if pressing a button. Gesture-recognition module 158 correlates the height of the user's hand to one of the displayed entries, which it highlights on screen 222 and further recognizes the selection gesture. Alternatively, the user can make the selection using mouse 204 or a keyboard.

Once an entry is selected, the user signals the system 130 that she is about to perform the gesture she wishes to associate with the selected command. This signal can be, for example, a voice command ("Start") or a keystroke. Alternatively, gesture recognition module 158 can cause the screen 222 to display a countdown graphic ("3 . . . 2 . . . 1 . . . GO!"). Following the user's signal or at the end of the countdown, the user's gesture is recorded by the cameras 102, 104 and the image frames corresponding thereto are stored frame buffers (in camera interface 136 or in memory 134). The user can signal completion of the gesture by voice command ("Done") or simply by momentarily freezing her action, which is sensed by gesture recognition module 158, or by any other suitable action. The frame buffers captured during the time period of gesture performance are analyzed by gesture recognition module 158 and converted to a gesture template for storage in the gesture database 232. In some implementations, the gesture is vectorized as discussed above and stored as a vector in (or linked to) the associated record in database 232.

It should be stressed that, although the process of defining gestures and associating them with commands has been discussed with respect to input-device commands, the approach is applicable to any type of gesture used for any purpose. For example, if the gesture-recognition module 158 is implemented as part of a specific application (such as a game or controller logic for a television), the database gesture record can inherit attributes (such as a scaling value or mapping parameters) specific to that application. Otherwise, when an application invokes the gesture-recognition module 158, it interprets the identified gesture in accordance with its own programming, and can permit the user to modify the default library of gestures as outlined above.

In some implementations, the conventional control icons (e.g., a cursor 236 and/or an arrow 238) are retained on the screen in the usual fashion. In other implementations, image generation module 164 generates an image 240 (e.g., of the user's hand) that will either supplement or replace the conventional icons as described below. Image generation module 240 can be a conventional rendering program that utilizes the gesturing object directly or indirectly as the basis for the image 240. For example, image generation module 240 can utilize the hand 202 detected by object detection module 152 and simply extract the corresponding pixels from the associated image frames, resampling the pixels so the hand image is appropriately sized for display—e.g., so that the size of the rendered image 240 is comparable to the size of the conventional icon. Indeed, the rendered hand can exactly match in size the conventional on-screen hand icon, so that the squeezing and dragging commands already associated with the hand icon (and typically affected with a mouse) can be gestured by the user.

Alternatively, image generation module 164 can utilize more complex mappings in rendering an image based on the user's gestures. A detected object or body part can be mapped to virtually any image in accordance with conventional graphics techniques, e.g., affine mapping. A user's hand, in other words, can be rendered as an animal's paw, a cartoon character or other image whose on-screen appearance varies in response to the changing orientation and configuration of the user's hand in accordance with the mapping.

Figure 2B:
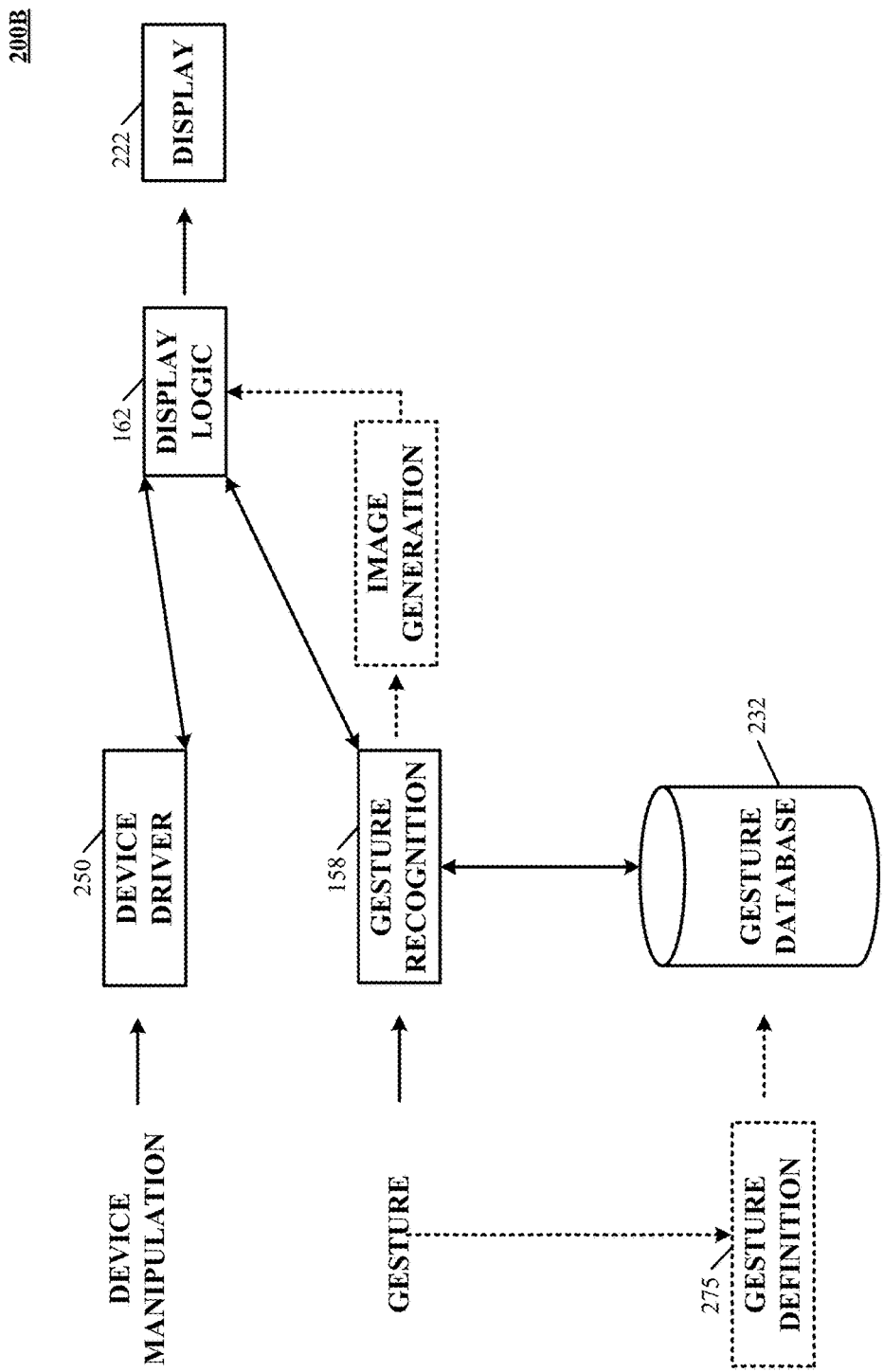
FIG. 2B is a simplified data-flow chart illustrating an approach for determining contents displayed on an electronic device in accordance with an implementation of the technology disclosed.

The operation 200B of display logic 162 is best understood with reference to FIG. 2B. Operation of an input device is detected by the associated device driver 250 and, in the conventional case, controls on-screen activity via the driver 250 and operating system 143, as well as the running application currently active on the display 222. In accordance with implementations of the technology disclosed, gesture recognition module 158 determines whether gesture database 232 contains gestures corresponding to the device-driver commands and, if not, executes the above-described gesture-recognition routine (as indicated at 275) to populate the appropriate database records. Optionally, in response to a detected input gesture, an image is generated for display by image generation module 164. Display logic 162 acts, in effect, as a switch that determines whether the conventional driver icons, the generated images or both appear on display

222. Display logic 162 can include a rule-executing script that responds to sensed conditions and user selections in accordance with criteria selected by the system designer. For example, display logic 162 can implement the following simplified rules (among others):

- If an input device is operated, it takes priority, and only the standard device icons are displayed.
- If the user activates (e.g., by means of a signal gesture or using a keystroke) gesture interaction, the standard device icons remain but are controlled by gesture.
- If no input device is detected in the field of view 112, an image generated by image-generation module 164 replaces the standard device icons and gesture recognition is enabled.
- If the user signals (e.g., by means of a signal gesture or using a keystroke) a preference for display of both the standard icons and images, both are rendered in proximity to each other on display 222.
- If the user turns off gesture recognition (e.g., by means of a signal gesture or using a keystroke), control returns to the device driver 250.

Alternatively or in addition, the mode adopted by display logic 162 can be dictated by the currently active running application; for example, display logic 162 can detect that the application is a traditional one (such as a word processor, spreadsheet or web browser) and that standard icons are appropriate, whereas in some circumstances, the application itself will communicate a mode of operation to display logic 162.

Figure 3:
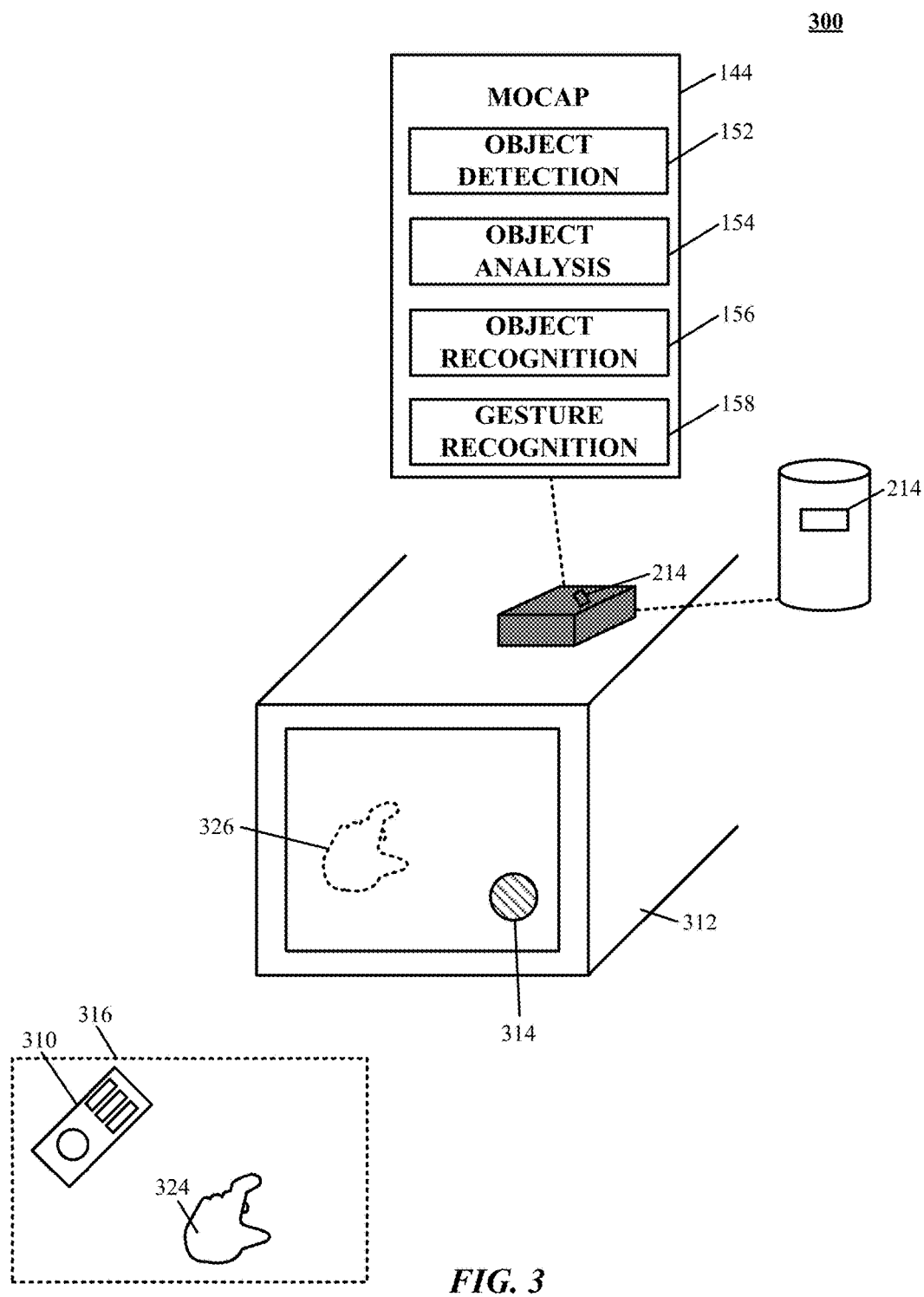
FIG. 3 depicts dynamically operating the electronic device alternately using the input device and/or user's gestures in accordance with an implementation of the technology disclosed.

FIG. 3 depicts dynamically operating 300 the electronic device alternately using the input device and/or user's gestures in accordance with an implementation of the technology disclosed. If a captured image contains both the input device 310 and a user's body part 324, display logic 162 can require the user to elect one approach that dominantly controls the operation of the electronic device 312 and/or the virtual objects 314. For example, when the object-recognition module 156 detects the presence of both input device 310 and the user's body part 324, display logic 162 can cause display of a message urging the user to indicate which input approach is preferred by, for example, pressing a button on the input device 310 or performing a gesture using body part 324. In one implementation, the input device 310 and the user's body part 324 can be continuously monitored until one of them moves; display logic 162 selects the first moving object as the controlling input approach. Display logic 162 can, alternatively or in addition, accord different priorities to different input devices. When multiple input devices 310 and/or user's body parts 324 are detected, the object-recognition module 156 can select the controlling input approach based on the priority level associated therewith (e.g., the highest priority level).

Figure 4:
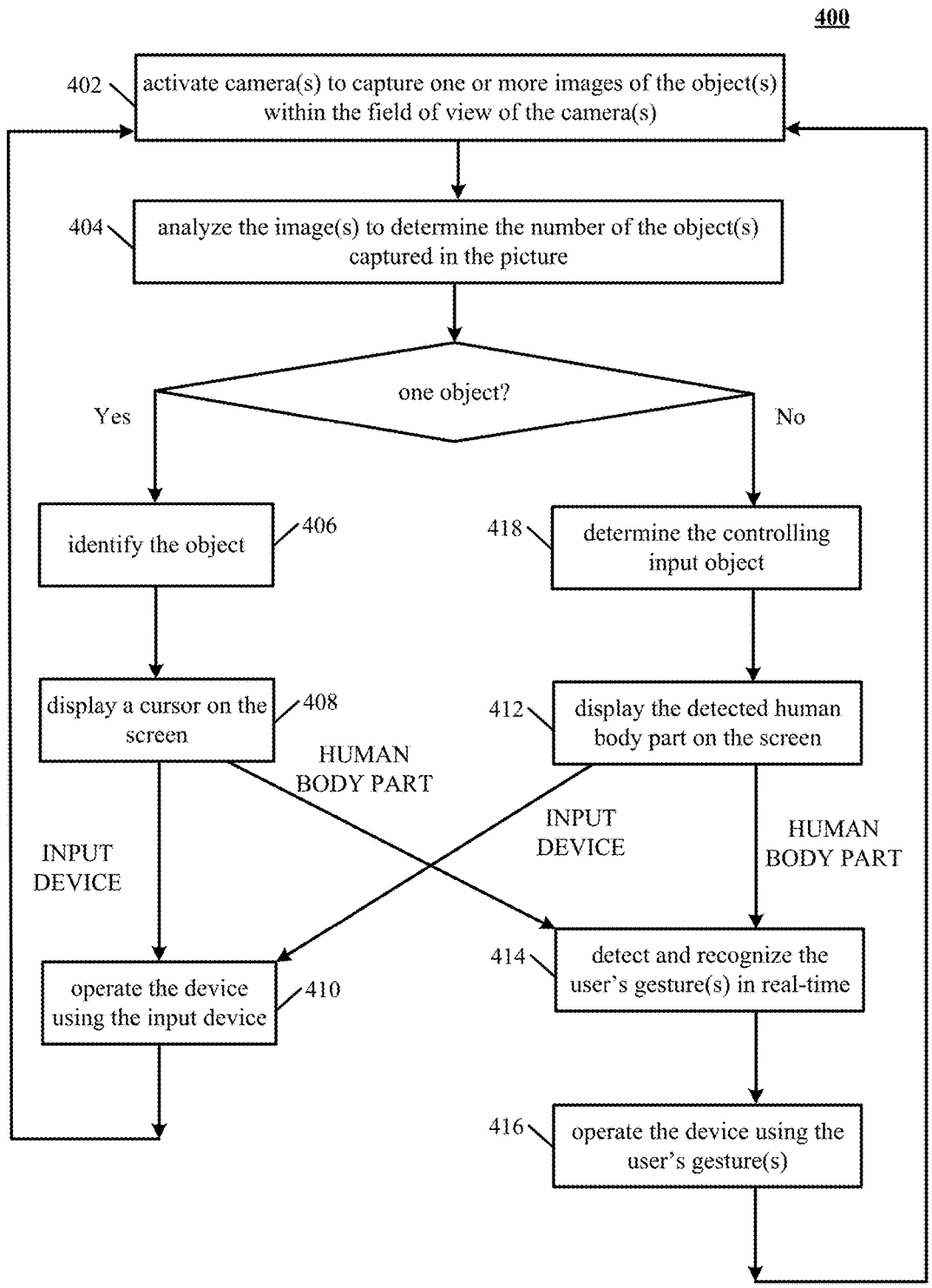
FIG. 4 depicts a flowchart illustrating dynamically operating the electronic device alternately using the input device and/or user's gestures in accordance with an implementation of the technology disclosed.

A flowchart 400 of a representative method for dynamically operating an electronic device and/or manipulating virtual objects displayed on the device's screen based on detecting the presence of a traditional input device and user gestures is shown in FIG. 4. In an action 402, one or more cameras are activated to capture images of one or more objects within the field of view of the camera(s). In an action 404, the captured image(s) are analyzed to computationally determine the number of object(s) captured in the picture. If only one object is detected, the object is computationally identified—e.g., as a physical input device or a part of a human's body; this can be achieved using, for example, analysis of reflections or shadows, as described in the '953 application mentioned above (in an action 406). If the identified object is a physical input device, a cursor is generated and displayed on the electronic device's screen (in an action 408). In addition, the electronic device is activated so that the input device directly communicates therewith (in an action 410). If the captured object is identified as a user's body part, a scaled image or a cartooned figure of the detected body part is displayed on the electronic device's screen (in an action 412). Gesture(s) performed by the user's body part are detected and rendered on the screen in real time, reflecting the actual movements of the user's body part (in an action 414). Additionally, the gesture(s) can be recognized to enable the user to operate the electronic device and/or manipulate the virtual objects displayed thereon (in an action 416). The above-described procedure can be iteratively performed on each captured image. In various implementations, if more than one object, such as the input device and the user's body part, are captured in the image(s), the user can be prompted to indicate which input approach govern the operation of the electronic device; alternatively, the controlling input approach can be selected based on the priority levels associated with the input devices and the user's body part (in an action 418). In an action 420, the cursor or user's body part is rendered on the screen to enable the user to operate the electronic device and/or manipulate the virtual objects. Again, this procedure can be applied to each captured image.

Figure 5:
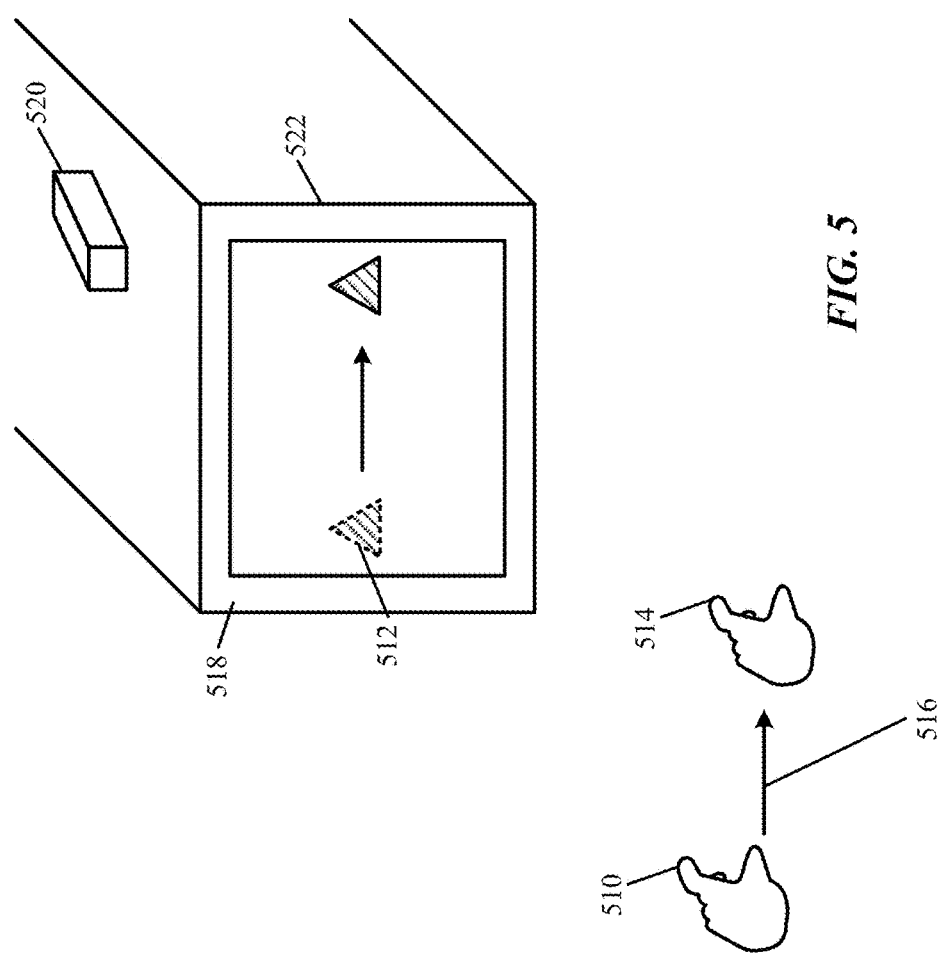
FIG. 5 depicts a recognized gesture utilized to operate the electronic device and manipulate virtual objects displayed thereon in accordance with an implementation of the technology disclosed.

Even if gestural control in lieu of input devices is turned off, gestures can nonetheless be employed by running applications configured specifically to respond to gestures. For example, a running application (e.g., a game) can convert user's movement to a simulated physical force applied to the selected object. Referring to FIG. 5, it is an illustration 500 of a recognized gesture being utilized to operate the electronic device and manipulate virtual objects displayed thereon in accordance with an implementation of the technology disclosed. A user, for example, can first "click" her first finger 510 to select the virtual object 512 and then slide her hand 514 to the right as indicated at 516 to move the elected object 512; the finger-clicking and hand-sliding gestures can be rendered on the device's screen 518 in real time as described above. In addition, upon detecting the hand-sliding movement 516, the gesture-recognition system 520 can convert it to a simulated force; the force can be converted based on a conventional physics simulation model, the degree of body movement, the mass and moving velocity of the body part, gravity, and/or any other relevant parameters. The application running on the electronic device 522, which generates the virtual object 512, responds to the force data by rendering a simulated the behavior of the virtual object 512 under the influence of the force, e.g., based on a motion model which includes the Newtonian physical principles. For example, if the user's movement is relatively small within a predetermined range (e.g., less than one centimeter) and/or relatively slow, the converted force deforms the shape of the selected object 512; if, however, the user's movement exceeds the determined range (i.e., more than 10 centimeters) or a threshold velocity, the device 522 treats the converted force as large enough (i.e., larger than the simulated static friction force) to move the selected object 512. The motion of the object 512 upon receiving the push force is simulated by the rendering application of the device 522 based on the motion model; this motion behavior is then updated on the screen. The rendering application can take other actions with respect to the virtual object 512, e.g., stretching, bending, or operating mechanical controls over buttons, levers, hinges, handles, etc. As a result, the simulated force replicates the effect of equivalent forces in the real world and makes the interaction predictable and realistic for the user.

It should be stressed that the foregoing functional division between the gesture-recognition system 520 and the rendering application running on the device 522 is exemplary only; in some implementations the two entities are more tightly coupled or even unified, so that rather than simply passing generic force data to the application, the gesture-recognition system 520 has world knowledge of the environment as rendered on the device 522. In this way, the gesture-recognition system 520 can apply object-specific knowledge (e.g., friction forces and inertia) to the force data so that the physical effects of user movements on the rendered objects are computed directly (rather than based on generic force data generated by the gesture-recognition system 520 and processed on an object-by-object basis by the device 522). Moreover, in various implementations, the mocap 144 runs on the device 522, and the component 520 is a simple sensor that merely sends images (e.g., high-contrast images) to the device 522 for analysis by the mocap 144. In such implementations, the mocap 144 can be a separate application that provides gesture information to the rendering application (such as a game) running on the device 522, or, as discussed above, can be integrated within the rendering application (e.g., a game application can be provided with suitable mocap functionality). This division of computational responsibility between the gesture-recognition system 520 and the electronic device 522, as well as between hardware and software, represents a design choice.

The technology disclosed can be used in connection with numerous applications including, without limitation, consumer applications such as interfaces for computer systems, laptops, tablets, telephone devices and/or as interfaces to other devices; gaming and other entertainment applications; medical applications including controlling devices for performing robotic surgery, medical imaging systems and applications such as CT, ultrasound, x-ray, MRI or the like; laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigation systems control, on-board entertainment systems control and/or environmental systems control; automotive applications including interfaces to and/or control of automobile operational systems, navigation systems, on-board entertainment systems and/or environmental systems; manufacturing and/or process applications including interfaces to assembly robots, automated test apparatus, work conveyance devices such as conveyors, and/or other factory floor systems and devices; genetic sequencing machines, semiconductor fabrication related machinery, chemical process machinery and/or the like; security applications (e.g., monitoring secure areas for suspicious activity or unauthorized personnel); and/or combinations thereof.

Figure 6:
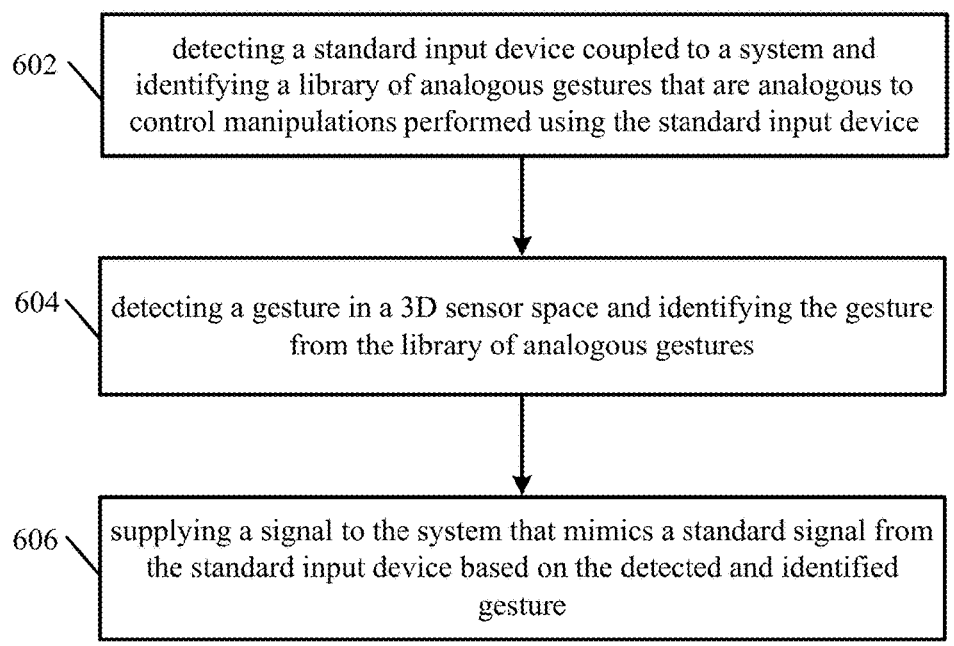
FIG. 6 illustrates one implementation of using gestures to supplant or augment use of a standard input device coupled to a system.

FIG. 6 illustrates one implementation of using gestures to supplant or augment use of a standard input device coupled to a system. Flowchart 600 can be implemented at least partially with and/or by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 602, a standard input device coupled to a system is detected and a library of analogous gestures is identified. Gestures from the library of analogous gestures are analogous to control manipulations performed using the standard input device. The standard input device generates particular standard signals in response to performance of respective control manipulations. These particular standard signals are supplied to the system in response to performance of identified gestures from the library of analogous gestures as a substitute for performance of the respective control manipulations.

In one implementation, the standard input device is a mouse and the control manipulations include at least right-click, left-double-click, and left-click. In some implementations, populating the library of analogous gestures includes receiving a selection from a user of a control manipulation performed using the standard input device, prompting the user to perform a gesture and assigning the gesture as analogous to the selected control manipulation and updating the library of analogous gestures to include the assigned gesture.

In other implementations, a library of analogous gestures analogous to on-screen actions is created. This includes receiving a selection from a user of an on-screen action, prompting the user to perform a gesture, assigning the performed gesture as analogous to the selected on-screen action, and updating the library of gestures to include the assigned gesture such that performance of the assigned gesture generates the selected on-screen action.

At action 604, a gesture in a 3D sensor space is detected and identified from the library of analogous gestures. In one implementation, a database that specifies a plurality of gestures and corresponding control manipulations and respective actions displayable on the display is used. In some implementations, the gesture is converted into a vectorized representation, which is then associated with the control manipulations.

At action 606, a signal is supplied to the system that mimics a standard signal from the standard input device based on the detected and identified gesture. In one implementation, performance of identified gestures from the library of analogous gestures causes on-screen responsiveness produced by respective control manipulations performed using the standard input device.

In some implementations, performance of identified gestures from the library of analogous gestures includes gesturing with at least one control object and further includes generating a representation of the control object and of movement of the control object. In one implementation, the generated representation is a scaled replica of the control object. In another implementation, the generated representation is an animation of the control object.

Some other implementations include determining a control paradigm to control on-screen responsiveness based on an active application running on the system in response to detecting the standard input device and a control object used to performs gesture from the library of analogous gestures. This control paradigm identifies whether the active application is responsive to the standard input device or the control object This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 7:
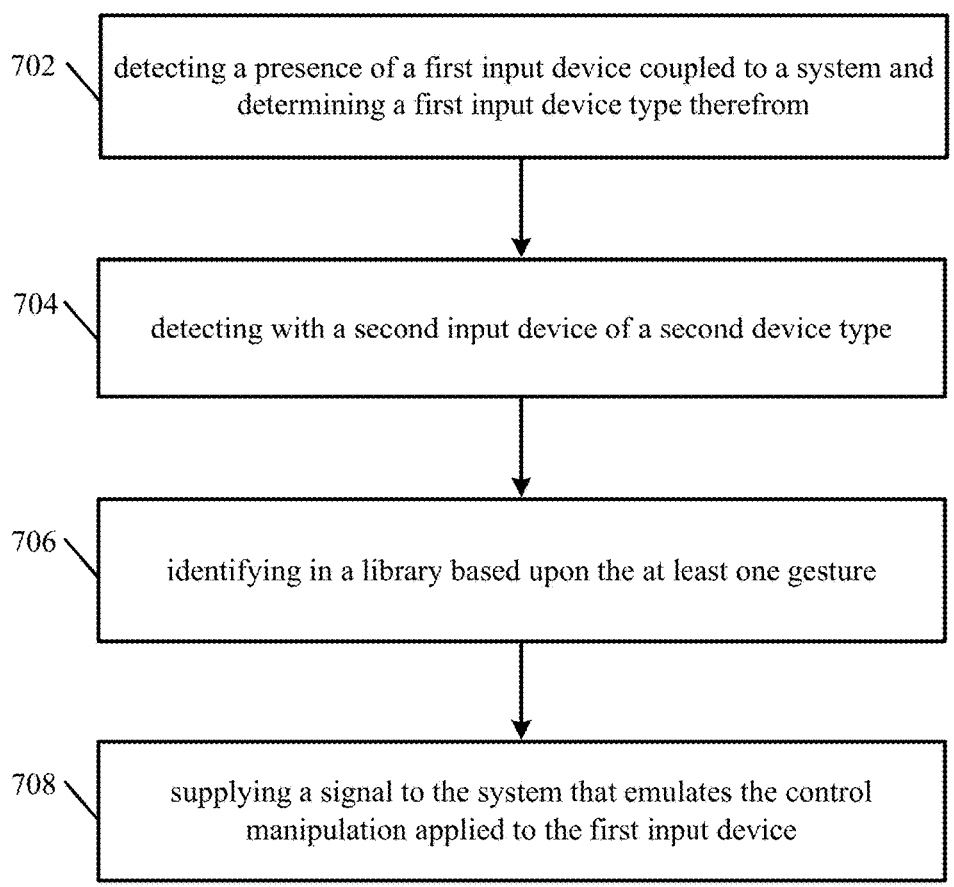
FIG. 7 is a flowchart showing of a method of controlling a system using more than one input device.

FIG. 7 is a flowchart showing of a method of controlling a system using more than one input device. Flowchart 700 can be implemented at least partially with and/or by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 702, a presence of a first input device coupled to a system is detected and a first input device type is determined therefrom. In one implementation, detecting a presence of a first device includes detecting a mouse coupled to the system and wherein the command information includes a mouse button click.

At action 704, at least one gesture made by a hand in a 3D sensor space and with a second input device, of a second device type, is detected. The hand is adjacent to, but not necessarily in contact with, the second input device and indicates an input to the system. In one implementation, detecting with a second device includes detecting a gesture using an imaging input sensor.

At action 706, at least one control manipulation is identified in a library upon the at least one gesture. This gesture when applied to the first input device, would provide command information analogous to the input to the system indicated by the at least one gesture. In one implementation, identifying in a library includes searching a database that specifies a plurality of gestures and corresponding control manipulations and respective actions displayable on the display is used. In some implementations, the gesture is converted into a vectorized representation, which is then associated with the control manipulations.

At action 708, a signal is supplied to the system that emulates the control manipulation applied to the first input device. In one implementation, performance of gestures identified in the library gestures causes on-screen responsiveness produced by respective control manipulations performed using the first input device.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Certain implementations of the technology disclosed were described above. It is, however, expressly noted that the technology disclosed is not limited to those implementations, but rather the intention is that additions and modifications to what was expressly described herein are also included within the scope of the technology disclosed. For example, it can be appreciated that the techniques, devices and systems described herein with reference to examples employing light waves are equally applicable to methods and systems employing other types of radiant energy waves, such as acoustical energy or the like. Moreover, it is to be understood that the features of the various implementations described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed. As such, the technology disclosed is not to be defined only by the preceding illustrative description.

What is claimed is:

1. A method performed by a gesture recognition and control system for using gestures to supplant or augment use of a standard input device coupled to an electronic device, the method including:
   capturing, in a three-dimensional (3D) sensor space, an image including the standard input device and a body part of a user;
   identifying the standard input device and the body part of the user included in the captured image;
   matching the standard input device in the captured image to an entry of an object template or image in a database, wherein the database maps standard input devices to object templates or images, and wherein each standard input device respectively generates one or more standard signals in response to performing one or more specific control manipulations with each respective standard input device;
   detecting that the captured image includes a depiction of a coupling between the matched standard input device and the electronic device;
   receiving, after the steps of identifying the body part of the user and detecting that the captured image depicts the matched standard input device coupled to the electronic device, an input from the user indicating the user prefers to control the electronic device with 3D gestures over controlling the electronic device by performing control manipulations directly from the standard input device;
   identifying a library of analogous 3D gestures that are analogous to the control manipulations performed using the matched standard input device;
   detecting a gesture in the 3D sensor space;
   identifying the gesture from the library of analogous 3D gestures;
   identifying a signal corresponding to the identified gesture in the library of analogous 3D gestures, the identified signal mimicking the standard signal for performing the specific control manipulation from the matched standard input device; and
   providing the identified signal, which mimics the standard signal, to the electronic device instructing the electronic device to perform the specific control manipulation.

2. The method of claim 1, wherein the matched standard input device is a mouse and the control manipulations include at least a right-click, a left-double-click, and a left-click.

3. The method of claim 1, further including populating the library of analogous 3D gestures, including:
receiving a selection from a user of a control manipulation performed using the matched standard input device;
prompting the user to perform a gesture;
assigning the gesture as analogous to the selected control manipulation; and
updating the library of analogous 3D gestures to include the assigned gesture.

4. The method of claim 1, wherein a performance of identified gestures from the library of analogous 3D gestures causes on-screen responsiveness produced by respective control manipulations performed using the matched standard input device.

5. The method of claim 4, wherein the performance of identified gestures from the library of analogous 3D gestures causes an interaction with one or more screen icons responsive to respective control manipulations performed using the matched standard input device.

6. The method of claim 5, wherein the performance of identified gestures from the library of analogous 3D gestures includes gesturing with at least one control object, including:
generating a representation of the control object and of a movement of the control object.

7. The method of claim 6, wherein the generated representation of the control object is a scaled replica of the control object.

8. The method of claim 6, wherein the generated representation of the control object is an animation of the control object.

9. The method of claim 1,
wherein the method further includes, responsive to matching the standard input device and detecting a control object used to perform a gesture from the library of analogous 3D gestures, determining a control paradigm to control on-screen responsiveness based on an active application running on the electronic device, and
wherein the control paradigm identifies whether the active application is responsive to the matched standard input device or the detected control object.

10. The method of claim 1, further including creating the library of analogous 3D gestures analogous to on-screen actions, including:
receiving a selection from a user of an on-screen action;
prompting the user to perform a gesture;
assigning the performed gesture as analogous to the selected on-screen action; and
updating the library of analogous 3D gestures to include the assigned gesture, such that a performance of the assigned gesture generates the selected on-screen action.

11. A method performed by a gesture recognition and control system for controlling a display using gestures, the method including:
capturing, in a three-dimensional (3D) sensor space, an image including a standard input device that causes on-screen actions on the display and a body part of a user;
identifying the standard input device and the body part of the user included in the captured image;
matching the standard input device in the captured image to an entry of an object template or image in a database, wherein the database maps standard input devices to object templates or images, and wherein each standard input device respectively generates one or more standard signals in response to performing one or more specific control manipulations with each respective standard input device;
detecting that the captured image includes a depiction of a coupling between the matched standard input device and the display;
receiving, after the steps of identifying the body part of the user and detecting that the captured image depicts the matched standard input device coupled to the display, an input from the user indicating the user prefers to control the display with 3D gestures over controlling the display by performing control manipulations directly from the standard input device;
identifying a library of analogous 3D gestures that (i) are analogous to the control manipulations performed using the matched standard input device and (ii) cause the on-screen actions responsive to the control manipulations;
detecting a gesture in the 3D sensor space;
identifying the gesture from the library of analogous 3D gestures;
identifying a signal corresponding to the identified gesture in the library of analogous 3D gestures, the identified signal (i) mimicking the standard signal for performing the specific control manipulation from the matched standard input device and (ii) causing the on-screen actions; and
providing the identified signal, which mimics the standard signal, instructing the display to display the on-screen actions.

12. The method of claim 11, wherein the matched standard input device is a mouse and the control manipulations include at least a right-click, a left-double-click, and a left-click.

13. The method of claim 11, further including populating the library of analogous 3D gestures, including:
receiving a selection from a user of a control manipulation performed using the matched standard input device;
prompting the user to perform a gesture;
assigning the gesture as analogous to the selected control manipulation; and
updating the library of analogous 3D gestures to include the assigned gesture.

14. A computer system for using gestures to supplant or augment use of a standard input device coupled to an electronic device, the computer system including:
a processor and a computer readable storage medium storing computer instructions configured to cause the processor to:
capture, in a three-dimensional (3D) sensor space, an image including the standard input device and a body part of a user;
identify the standard input device and the body part of the user included in the captured image;
match the standard input device in the captured image to an entry of an object template or image in a database, wherein the database maps standard input devices to object templates or images, and wherein each standard input device respectively generates one or more standard signals in response to performing one or more specific control manipulations with each respective standard input device;
detect that the captured image includes a depiction of a coupling between the matched standard input device and the electronic device;
receive, after the identification of the body part of the user and detection that the captured image depicts the matched standard input device coupled to the electronic device, an input from the user indicating the user prefers to control the electronic device with 3D gestures over controlling the electronic device by performing control manipulations directly from the standard input device;

identify a library of analogous 3D gestures that are analogous to the control manipulations performed using the matched standard input device;

detect a gesture in the 3D sensor space;

identify the gesture from the library of analogous 3D gestures;

identify a signal corresponding to the identified gesture in the library of analogous 3D gestures, the identified signal mimicking the standard signal for performing the specific control manipulation from the matched standard input device; and provide the identified signal, which mimics the standard signal, to the electronic device instructing the electronic device to perform the specific control manipulation.

15. The computer system of claim 14, wherein the computer instructions are further configured to cause the processor to populate the library of analogous 3D gestures, including:

receiving a selection from a user of a control manipulation performed using the matched standard input device;

prompting the user to perform a gesture;

assigning the gesture as analogous to the selected control manipulation; and updating the library of analogous 3D gestures to include the assigned gesture.

16. The computer system of claim 14, wherein a performance of identified gestures from the library of analogous 3D gestures causes on-screen responsiveness produced by respective control manipulations performed using the matched standard input device.

17. The computer system of claim 14, wherein the computer instructions are further configured to cause the processor to determine a control paradigm to control on-screen responsiveness based on an active application running on the computer system in response to matching the standard input device and detecting a control object used to perform a gesture from the library of analogous 3D gestures, and wherein the control paradigm identifies whether the active application is responsive to the matched standard input device or the detected control object.

18. The computer system of claim 14, wherein the computer instructions are further configured to cause the processor to create the library of analogous 3D gestures analogous to on-screen actions, including:

receiving a selection from a user of an on-screen action;

prompting the user to perform a gesture;

assigning the performed gesture as analogous to the selected on-screen action; and updating the library of analogous 3D gestures to include the assigned gesture, such that a performance of the assigned gesture generates the selected on-screen action.

\* \* \* \* \*